(12) United States Patent
Mao et al.

(10) Patent No.: US 12,172,903 B2
(45) Date of Patent: Dec. 24, 2024

(54) PHOSPHORUS-CONTAINING HIGH-SILICA MOLECULAR SIEVE, ITS PREPARATION AND APPLICATION THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Yichao Mao, Beijing (CN); Mingfeng Li, Beijing (CN); Xiangyun Long, Beijing (CN); Runqiang Zhang, Beijing (CN); Yang Zhao, Beijing (CN); Guangle Zhao, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

(*) Notice: Subject to any disclaimer, the term of this patent is extended or adjusted under 35 U.S.C. 154(b) by 742 days.

(21) Appl. No.: 17/287,903

(22) PCT Filed: Aug. 22, 2019

(86) PCT No.: PCT/CN2019/102008
§ 371 (c)(1),
(2) Date: Apr. 22, 2021

(87) PCT Pub. No.: WO2020/082880
PCT Pub. Date: Apr. 30, 2020

(65) Prior Publication Data
US 2021/0395100 A1 Dec. 23, 2021

(30) Foreign Application Priority Data

Oct. 26, 2018 (CN) .......................... 201811259943.0
Oct. 26, 2018 (CN) .......................... 201811261400.2

(51) Int. Cl.
*C01B 39/24* (2006.01)
*B01J 6/00* (2006.01)
*B01J 29/16* (2006.01)

(52) U.S. Cl.
CPC ............... *C01B 39/24* (2013.01); *B01J 6/001* (2013.01); *B01J 29/166* (2013.01); *C01P 2002/70* (2013.01)

(58) Field of Classification Search
None
See application file for complete search history.

(56) References Cited

U.S. PATENT DOCUMENTS 4,684,617 A 8/1987 Lok et al.
6,399,530 B1 6/2002 Chen et al.
(Continued)

FOREIGN PATENT DOCUMENTS

BE 1016877 A6 * 8/2007 ............. C01B 33/44
CN 1194884 A 10/1998
(Continued)

*Primary Examiner* — Sheng H Davis
(74) *Attorney, Agent, or Firm* — NKL Law; Allen Xue

(57) ABSTRACT

Disclosed are a phosphorus-containing high-silica molecular sieve, its preparation and application thereof, wherein the molecular sieve comprises about 86.5-99.8 wt % of silicon, about 0.1-13.5 wt % of aluminum and about 0.01-6 wt % of phosphorus, calculated as oxides and based on the dry weight of the molecular sieve, the molecular sieve has an XRD pattern with at least three diffraction peaks, the first strong peak is present at a diffraction angle of about 5.9-6.9°, the second strong peak is present at a diffraction angle of about 10.0-11.0°, and the third strong peak is present at a (Continued)

diffraction angle of about 15.6-16.7°. The phosphorus-containing high-silica molecular sieve shows an improved hydrocracking activity in the presence of nitrogen-containing species when used in the preparation of hydrocracking catalysts.

20 Claims, 1 Drawing Sheet

(56) References Cited

U.S. PATENT DOCUMENTS

| | | |
|---|---|---|
| 8,932,454 B2 | 1/2015 | Wu et al. |
| 9,278,342 B2 | 3/2016 | Ghosh |
| 2013/0118954 A1 | 5/2013 | Wu et al. |

FOREIGN PATENT DOCUMENTS

| | | |
|---|---|---|
| CN | 1055961 C | 8/2000 |
| CN | 1088407 C | 7/2002 |
| CN | 1112245 C | 6/2003 |
| CN | 1465527 A | 1/2004 |
| CN | 1727280 A | 2/2006 |
| CN | 1727447 A | 2/2006 |
| CN | 101757931 A | 6/2010 |
| CN | 108262067 A | 7/2018 |
| RU | 2601462 C2 | 10/2016 |

* cited by examiner

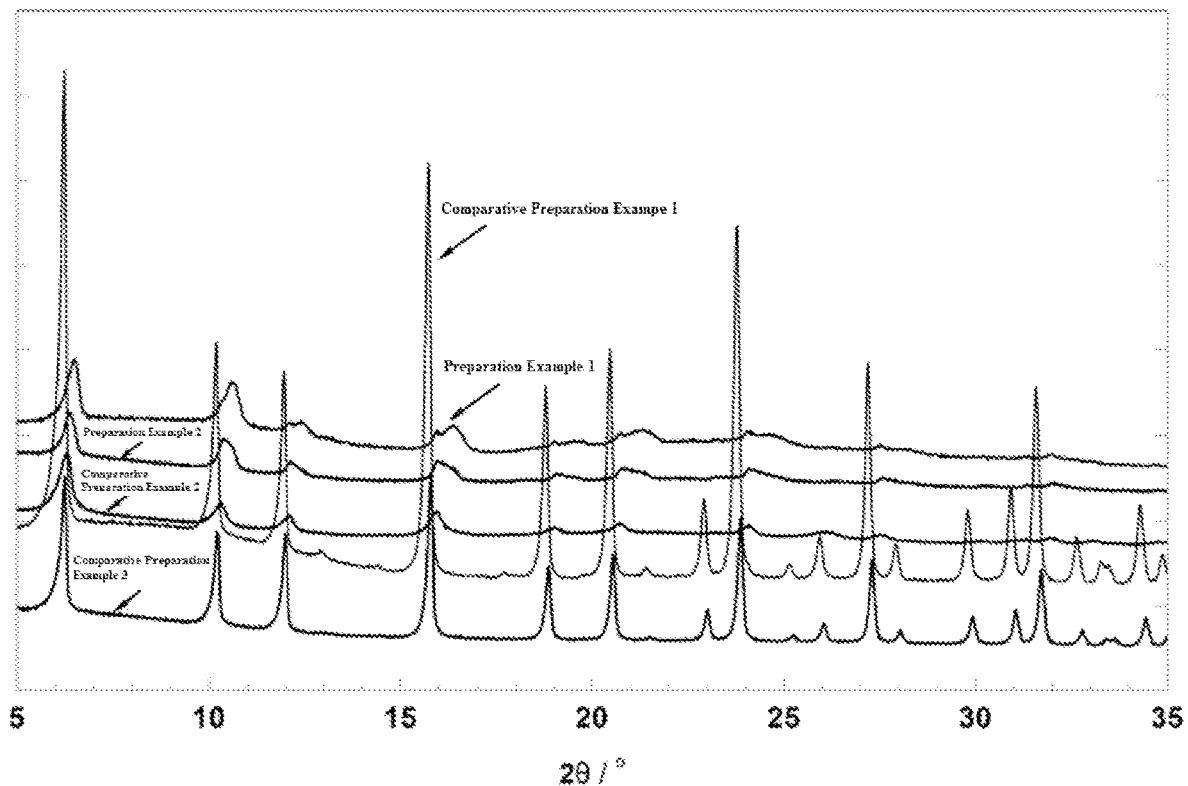

PHOSPHORUS-CONTAINING HIGH-SILICA MOLECULAR SIEVE, ITS PREPARATION AND APPLICATION THEREOF

CROSS REFERENCE TO RELATED APPLICATIONS

The present application claims the priority of the Chinese patent application No. 201811259943.0, titled "phosphorus-containing high-silica molecular sieve, its preparation and application thereof", filed on Oct. 26, 2018, and the Chinese patent application No. 201811261400.2, titled "hydrocracking catalyst containing high-silica molecular sieve, its preparation and application thereof", filed on Oct. 26, 2018, the contents of which are incorporated herein by reference in their entirety.

The present application is a national stage entry of PCT International Application No. PCT/CN2019/102008, filed on Aug. 22, 2019.

TECHNICAL FIELD

The application relates to the field of molecular sieves and hydrocracking, in particular to a phosphorus-containing high-silica molecular sieve, a hydrocracking catalyst containing the same, their preparation and application thereof.

BACKGROUND ART

Commercial hydrocracking feedstocks include heavy and inferior fractions such as VGO, which contain a large amount of polycyclic aromatics and naphthenes, as well as a significant amount of nitrogen-containing compounds. The mass percent of nitrogen in conventional hydrocracking feedstocks is typically between 0.1% and 0.2%. However, secondary processing of oil refining such as coking, solvent deasphalting, etc. often produce a significant amount of nitrogen-containing compounds, and the nitrogen content of the resulting material often exceeds 0.3%, and some even reaches 0.6%, which makes it difficult to remove the nitrogen content, after treatment with conventional refining catalysts, to a level of 10-100 ppm that can be tolerated by conventional molecular sieve type hydrocracking catalysts. Normally, weakly acidic amorphous aluminum silicate or silicon-containing alumina is used as the main acidic component of high nitrogen content hydrocracking catalysts.

In prior arts, the synthesis of weakly acidic aluminum silicate is normally carried out at a desired pH value by using a salt solution of silicon oxide and aluminum oxide, or by grafting alumina on a silica precursor or grafting silica on an alumina precursor and conducting a further reaction to produce a silica-alumina tetrahedron, so that acid site is generated in a sample.

Chinese patent No. ZL97121663.0 discloses a hydrocracking catalyst especially suitable for producing middle distillate, which comprises amorphous silica-alumina component, microporous alumina binder, at least one Group VIB element and at least one Group VIII element, wherein the content of amorphous silica-alumina is 30-60 wt %, the total content of hydrogenating metal oxides is 20-35 wt %, and the balance is microporous alumina binder, and the catalyst is characterized in that it has a specific surface of 150-300 $m^2/g$, a pore volume of 0.25-0.50 mL/g, a distribution of 4-15 nm pores of 60-90%, and an infrared acidity of 0.30-0.50 mmol/g.

Although these methods can produce materials with certain acidity, in the synthesis process, in order to keep the stability of the matrix structure, a large amount of non-framework hexacoordinate aluminum is present in the resulting product. As a result, the material obtained is only short-range ordered, and it is difficult to be long-range ordered.

SUMMARY OF THE INVENTION

It is an object of the present application to provide a phosphorus-containing high-silica molecular sieve, a hydrocracking catalyst containing the same, their preparation and application thereof, which molecular sieve shows an improved hydrocracking activity in the presence of nitrogen-containing species when used in the preparation of hydrocracking catalysts.

To accomplish the above object, in an aspect, the present application provides a phosphorus-containing high-silica molecular sieve comprising about 86.5-99.8 wt % of silicon, about 0.1-13.5 wt % of aluminum, and about 0.01-6 wt % of phosphorus, calculated as oxides and based on the dry weight of the molecular sieve, wherein the molecular sieve has an XRD pattern with at least three diffraction peaks, the first strong peak is present at a diffraction angle of about 5.9-6.9°, the second strong peak is present at a diffraction angle of about 10.0-11.0°, and the third strong peak is present at a diffraction angle of about 15.6-16.7°, preferably, the molecular sieve has a pore volume of about 0.20-0.50 mL/g and a specific surface area of about 250-670 $m^2/g$.

In another aspect, the present application provides a method for preparing a phosphorus-containing high-silica molecular sieve, comprising the steps of:
  a) subjecting a phosphorus-containing molecular sieve starting material to a hydrothermal treatment at a temperature of about 350-700° C., a pressure of about 0.1-8.0 MPa and in the presence of steam for about 0.5-10 h to obtain a hydrothermally treated molecular sieve material; the phosphorus-containing molecular sieve starting material has a phosphorus content of about 0.1-15 wt %, a sodium content of about 0.5-4.5 wt %, a silicon content of about 70-85 wt %, and an aluminum content of about 16.0-21.0 wt %, calculated as oxides and based on the dry weight of the phosphorus-containing molecular sieve starting material;
  b) adding water to the hydrothermally treated molecular sieve material obtained in the step a) to form a first slurry, heating the first slurry to about 40-95° C., then adding a first acid solution into the first slurry, while maintaining the temperature, in an amount such that the acidified first slurry has a pH value of about 2.3-4.0, reacting at a constant temperature for about 0.5-20 h, and collecting a first solid product;
  c) adding water to the first solid product obtained in the step b) to form a second slurry, heating the second slurry to about 40-95° C., then adding a second acid solution to the second slurry, while maintaining the temperature, in an amount such that the acidified second slurry has a pH value of about 0.8-2.0, reacting at a constant temperature for about 0.5-20 h, and collecting a second solid product.

In a further aspect, the present application provides the use of a phosphorus-containing high-silica molecular sieve according to the present application in the hydrocracking of hydrocarbon feedstocks, comprising a step of contacting a hydrocarbon feedstock with a hydrocracking catalyst comprising said phosphorus-containing high-silica molecular sieve.

In yet another aspect, the present application provides a hydrocracking catalyst comprising, based on the dry weight of the catalyst, about 45-90 wt % of a carrier, calculated on a dry basis; about 1-40 wt % of a first metal component, calculated as metal oxides, and about 1-15 wt % of a second metal component, calculated as metal oxides;

the carrier comprises a phosphorus-containing high-silica molecular sieve and a refractory inorganic oxide, wherein the weight ratio of the phosphorus-containing high-silica molecular sieve to the refractory inorganic oxide is about 0.03:1 to about 20:1;

wherein the first metal component comprises a Group VIB metal, the second metal component comprises a Group VIII metal, and the phosphorus-containing high-silica molecular sieve is a phosphorus-containing high-silica molecular sieve according to the present application.

In yet another aspect, the present application provides a method for preparing a hydrocracking catalyst, comprising the steps of:

mixing a phosphorus-containing high-silica molecular sieve according to the present application with a refractory inorganic oxide to produce a carrier; and contacting the carrier with an impregnation solution containing a first metal precursor and a second metal precursor for impregnation.

In a further aspect, the present application provides the use of a hydrocracking catalyst according to the present application in the hydrocracking of hydrocarbon feedstocks, comprising a step of contacting a hydrocarbon feedstock with said hydrocracking catalyst.

In the present application, a phosphorus-containing molecular sieve starting material is subjected to hydrothermal treatment and two stages of acid treatment under specific conditions to obtain a phosphorus-containing high-silica molecular sieve with novel structural features. The phosphorus-containing high-silica molecular sieve of the present application shows an improved hydrocracking activity in the presence of nitrogen-containing species when used for preparing hydrocracking catalysts. Accordingly, a hydrocracking catalyst prepared by the phosphorus-containing high-silica molecular sieve also has an improved hydrocracking activity.

Other features and advantages of the present application will be described in the detailed description hereinbelow.

BRIEF DESCRIPTION OF THE DRAWINGS

The drawings are provided to help the understanding of the present application, and should be considered as a part of the present description. The present application will be illustrated with reference to the drawings and the embodiments described herein below, which should not be considered to be limiting. In the drawings:

FIG. 1 shows XRD patterns of the molecular sieves obtained in Preparation Examples 1-2 and Comparative Preparation Examples 1-3.

DETAILED DESCRIPTION OF THE INVENTION

The present application will now be described in further detail with reference to embodiments thereof and the drawings, and it should be noted that the embodiments described herein are merely provided for the purpose of illustrating and explaining the present application, while are not intended to be restrictive in any manner.

Any numerical value (including the end values of numerical ranges) provided herein is not limited to the precise value recited, but should be interpreted as covering any value close to said precise value, such as all possible values within 5% of said precise value. Moreover, for any numerical range provided herein, one or more new numerical ranges can be obtained by arbitrarily combining the end values of the range, an end value with a specific value provided within the range, or various specific values provided within the range. Such new numerical ranges should also be considered as being specifically disclosed herein.

Unless otherwise stated, the terms used herein have the same meaning as commonly understood by those skilled in the art; and if the terms are defined herein and their definitions are different from the ordinary understanding in the art, the definition provided herein shall prevail.

In the present application, the dry weight of a material refers to the weight of a solid product obtained by calcining the material at 600° C. for 3 h.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to those skilled in the art that such a combination is obviously unreasonable.

All of the patent and non-patent documents cited herein, including but not limited to textbooks and journal articles, are hereby incorporated by reference in their entirety.

In a first aspect, the present application provides a phosphorus-containing high-silica molecular sieve comprising about 86.5-99.8 wt %, preferably about 90-99.8 wt %, of silicon, about 0.1-13.5 wt %, preferably about 0.1-9.0 wt %, of aluminum, and about 0.01-6 wt %, preferably about 0.01-2.5 wt %, of phosphorus, calculated as oxides and based on the dry weight of the molecular sieve. Optionally, the molecular sieve may further comprise a small amount of sodium, which may be about 0.01-1.0 wt %, e.g., about 0.01-0.6 wt %, calculated as an oxide and based on the dry weight of the molecular sieve.

In a preferred embodiment, the phosphorus-containing high-silica molecular sieve comprises about 90-99.8 wt % of silicon, about 0.1-9.0 wt % of aluminum, and about 0.01-2.5 wt % of phosphorus, calculated as oxides and based on the dry weight of the molecular sieve. Optionally, the molecular sieve may further comprise about 0.01-1.0 wt %, e.g., about 0.01-0.6 wt %, of sodium, calculated as an oxide and based on the dry weight of the molecular sieve.

In a further preferred embodiment, the phosphorus-containing high-silica molecular sieve comprises about 95.0-99.0 wt % of silicon, about 0.5-5.0 wt % of aluminum, and about 0.1-1.0 wt % of phosphorus, calculated as oxides and based on the dry weight of the molecular sieve. Optionally, the molecular sieve may further comprise about 0.01-0.6 wt % of sodium, calculated as an oxide and based on the dry weight of the molecular sieve.

In a preferred embodiment, the molecular sieve may have a pore volume of about 0.20-0.50 mL/g, preferably about 0.30-0.45 mL/g, e.g., about 0.33-0.42 mL/g; and/or the molecular sieve may have a specific surface area of about 250-670 m$^2$/g, preferably about 260-600 m$^2$/g, e.g., about 400-600 m$^2$/g.

In a further preferred embodiment, the molecular sieve has a pore volume of about 0.20-0.50 mL/g and a specific surface area of about 260-600 m$^2$/g.

According to the present application, the molecular sieve has structural features different from conventional aluminum silicate materials. Particularly, the molecular sieve has an XRD pattern with at least three diffraction peaks, the first strong peak is present at a diffraction angle of about 5.9-6.9°, preferably about 6.1-6.8°; the second strong peak is present at a diffraction angle of about 10.0-11.0°, preferably about 10.2-10.7°; and the third strong peak is present at a diffraction angle of about 15.6-16.7°, preferably about 15.8-16.5°, wherein the diffraction angle refers to the 2θ value at which the diffraction peak in the XRD pattern reaches its highest value.

In the present application, the ordinal numbers "first", "second" and "third" etc. in the expressions first, second and third strong peaks etc. represent the relative order of intensity of said diffraction peaks, determined by their peak heights, wherein the first strong peak refers to the diffraction peak with the highest peak height in the XRD pattern, the second strong peak refers to the diffraction peak with the second highest peak height in the XRD pattern, the third strong peak refers to the diffraction peak with the third highest peak height in the XRD pattern, and so on.

It is well known to those skilled in the art that, when analyzing the material structure by X-ray diffraction (XRD) analysis, the D value (interplanar spacing) can be generally calculated from the wavelength and diffraction angle, and the structure can be preliminarily identified based on the features of the strongest three diffraction peaks (i.e., the first, second and third strong peaks mentioned in the present application). The concept of the three strong peaks can be found in the literature, "Research Methods of Heterogeneous Catalysts", edited by Yuangen YIN, Beijing chemical industry Press, 1988, pp 140-170.

In a preferred embodiment, in the XRD pattern of the molecular sieve, $I_1/I_{23.5-24.5°}$ may be about 3.0-11.0, such as about 4.0-10.5 or about 4.6-10.1; $I_2/I_{23.5-24.5°}$ may be about 2.5-8.0, such as about 2.9-7.0 or about 3.0-6.4; $I_3/I_{23.5-24.5°}$ may be about 1.0-4.5, such as about 1.5-4.0 or about 2.1-3.8; wherein $I_1$ represents the peak height of the first strong peak, $I_2$ represents the peak height of the second strong peak, $I_3$ represents the peak height of the third strong peak, and $I_{23.5-24.5°}$ represents the peak height of the peak at a diffraction angle of about 23.5-24.5°.

In a further preferred embodiment, in the XRD pattern of the molecular sieve, $I_1/I_{23.5-24.5°}$ may be about 3.0-11.0, $I_2/I_{23.5-24.5°}$ may be about 2.9-7.0, $I_3/I_{23.5-24.5°}$ may be about 1.0-4.0, wherein $I_1$ represents the peak height of the first strong peak, $I_2$ represents the peak height of the second strong peak, $I_3$ represents the peak height of the third strong peak, and $I_{23.5-24.5°}$ represents the peak height of the peak at a diffraction angle of about 23.5-24.5°.

In some further preferred embodiments, in the XRD pattern of the molecular sieve, $I_1/I_{23.5-24.5°}$ may be about 4.0-10.5, $I_2/I_{23.5-24.5°}$ may be about 2.9-7.0, $I_3/I_{23.5-24.5°}$ may be about 1.5-4.0, wherein $I_1$ represents the peak height of the first strong peak, $I_2$ represents the peak height of the second strong peak, $I_3$ represents the peak height of the third strong peak, and $I_{23.5-24.5°}$ represents the peak height of the peak at a diffraction angle of about 23.5-24.5°.

In some further preferred embodiments, the molecular sieve has an XRD pattern with at least five diffraction peaks, wherein the fourth strong peak may be present at a diffraction angle of about 20.4-21.6°, preferably about 20.8-21.4°, and the fifth strong peak may be present at a diffraction angle of about 11.8-12.8°, preferably about 12.1-12.6°.

In a still further preferred embodiment, $I_4/I_{23.5-24.5°}$ may be about 1.0-4.0, such as about 1.1-3.0 or about 1.2-2.3, $I_5/I_{23.5-24.5°}$ may be about 1.0-2.0, such as about 1.0-1.6 or about 1.0-1.2, wherein $I_4$ represents the peak height of the fourth strong peak, $I_5$ represents the peak height of the fifth strong peak, and $I_{23.5-24.5°}$ represents the peak height of the peak at a diffraction angle of about 23.5-24.5°. The concept of the fourth strong peak and the fifth strong peak can be understood with reference to the description of the three strong peaks, and will not be described here again.

In some still further preferred embodiments, $I_4/I_{23.5-24.5°}$ may be about 1.1-3.0, $I_5/I_{23.5-24.5°}$ may be about 1.0-1.6, wherein $I_4$ represents the peak height of the fourth strong peak, $I_5$ represents the peak height of the fifth strong peak, and $I_{23.5-24.5°}$ represents the peak height of the peak at a diffraction angle of about 23.5-24.5°.

The phosphorus-containing high-silica molecular sieves of the present application shows an improved hydrocracking activity in the presence of nitrogen-containing species when used for preparing hydrocracking catalysts.

In a second aspect, the present application provides a method for preparing a phosphorus-containing high-silica molecular sieve, comprising the steps of:
   a) subjecting a phosphorus-containing molecular sieve starting material to a hydrothermal treatment at a temperature of about 350-700° C., a pressure of about 0.1-8.0 MPa and in the presence of steam for about 0.5-10 h to obtain a hydrothermally treated molecular sieve material; the phosphorus-containing molecular sieve starting material has a phosphorus content of about 0.1-15 wt %, a sodium content of about 0.5-4.5 wt %, a silicon content of about 70-85 wt %, and an aluminum content of about 16.0-21.0 wt %, calculated as oxides and based on the dry weight of the phosphorus-containing molecular sieve starting material;
   b) adding water to the hydrothermally treated molecular sieve material obtained in the step a) to form a first slurry, heating the first slurry to about 40-95° C., then adding a first acid solution into the first slurry, while maintaining the temperature, in an amount such that the acidified first slurry has a pH value of about 2.3-4.0, preferably about 2.5-4.0, reacting at a constant temperature for about 0.5-20 h, and collecting a first solid product; and
   c) adding water to the first solid product obtained in the step b) to form a second slurry, heating the second slurry to about 40-95° C., then adding a second acid solution into the second slurry, while maintaining the temperature, in an amount such that the acidified second slurry has a pH value of about 0.8-2.0, preferably about 1.0-2.0, reacting at a constant temperature for about 0.5-20 h, and collecting a second solid product.

In a preferred embodiment, the method for preparing a phosphorus-containing high-silica molecular sieve comprises the following steps:
   a) subjecting a phosphorus-containing molecular sieve starting material to a hydrothermal treatment a temperature of about 400-650° C., e.g., about 560° C., a pressure of about 0.5-5 MPa, e.g., about 0.8 MPa, and in the presence of steam for about 1-7 h, e.g., about 3 h, to obtain a hydrothermally treated molecular sieve material; the phosphorus-containing molecular sieve starting material has a phosphorus content of about 0.1-6 wt %, e.g., about 1.37 wt %, a sodium content of about 0.5-3.0 wt %, e.g., about 1.44 wt %, a silicon content of about 70-80 wt %, e.g., about 76.7 wt %, and an aluminum content of about 18.0-21.0 wt %, e.g., about 20.5 wt %, calculated as oxides and based on the dry weight of the phosphorus-containing molecular sieve starting material;

b) adding water to the hydrothermally treated molecular sieve material obtained in the step a) to form a first slurry, heating the first slurry to about 50-85° C., e.g., about 80° C., then adding a first acid solution to the first slurry, while maintaining the temperature, in an amount such that the acidified first slurry has a pH value of about 2.5-3.5, e.g., about 2.8, reacting at a constant temperature for about 1-10 h, e.g., about 4 h, and collecting a first solid product; and c) adding water to the first solid product obtained in the step b) to form a second slurry, heating the second slurry to about 50-85° C., e.g. about 80° C., then adding a second acid solution to the second slurry, while maintaining the temperature, in an amount such that the acidified second slurry has preferably a pH of about 1.0-1.8, e.g. about 1.4, reacting at a constant temperature for about 1-10 h, e.g. about 3 h, and collecting a second solid product.

In some embodiments according to the present application, in step a), the phosphorus-containing molecular sieve starting material refers to a phosphorus-containing molecular sieve. By using a phosphorus-containing molecular sieve starting material in the present application, phosphorus oxide and aluminum species outside the framework of the molecular sieve can improve the stability of the framework, so that the performance of the molecular sieve can be further improved. The phosphorus-containing molecular sieve starting material may have a faujasite molecular sieve structure, and is preferably a phosphorus-containing Y molecular sieve, which may have a lattice constant of about 2.425-2.47 nm, e.g., about 2.456 nm, a specific surface area of about 250-750 $m^2/g$, e.g., about 672 $m^2/g$, and a pore volume of about 0.2-0.95 mL/g, e.g., about 0.357 mL/g.

Further, the selection of the Y molecular sieve may vary widely as long as the phosphorus-containing molecular sieve starting material can satisfy the above requirements. For example, the Y molecular sieve may be selected from the group consisting of NaY, HNaY (H-type Y molecular sieve), REY (rare earth type Y molecular sieve), USY (ultrastable Y molecular sieve), and the like. The cation position of the phosphorus-containing Y molecular sieve may be occupied by one or more of sodium ions, ammonium ions and hydrogen ions; or alternatively, all or part of the sodium, ammonium and hydrogen ions may be replaced by other ions via conventional ion exchange before or after the introduction of phosphorus into the molecular sieve. The phosphorus-containing molecular sieve starting material may be a commercial product, or may be prepared in accordance with any existing methods. For example, the phosphorus-containing molecular sieve starting material may be prepared in accordance with the method disclosed in Chinese patent No. ZL00123139.1 for preparing USY molecular sieves, or the method disclosed in Chinese patent ZL200410071122.6 for preparing PUSY molecular sieves, and the like, of which the details are not described herein.

In the present application, the slurry forming (also referred to as slurrying) procedure involved in step b) and step c) is well known to a person skilled in the art. In some preferred embodiments, in step b), the ratio of the weight of water in the first slurry obtained after slurrying to the dry weight of the phosphorus-containing molecular sieve starting material may be from about 14:1 to about 5:1, e.g., about 10:1; and/or in step c), the ratio of the weight of water in the second slurry to the dry weight of the phosphorus-containing molecular sieve starting material may be from about 0.5:1 to about 20:1, e.g., about 10:1.

In some preferred embodiments according to the present application, in step b), the first slurry is heated to about 50-85° C., e.g., about 80° C., then the first acid solution is continuously added to the first slurry while maintaining the temperature until a desired pH of the acidified first slurry is obtained. The amount of the first acid solution added may vary widely depending on the nature of the phosphorus-containing molecular sieve starting material and the hydrothermal treatment conditions of step a). It can be appreciated by those skilled in the art that the first acid solution may be added in any amount sufficient to provide a pH of the acidified first slurry within the desired range as described above. The rate of addition of the first acid solution is not particularly limited and may vary over a wide range.

In some preferred embodiments according to the present application, in step b), the addition of the first acid solution may be performed for a plurality of times (e.g., 1 to 5 times), the resultant may be allowed to react at a constant temperature for a period of time after each acid addition, and then a next acid addition may be performed, until a pH of the acidified first slurry within the desired range is obtained. The first acid solution may have an acid concentration of about 0.1-15.0 mol/L, preferably about 0.1-5.0 mol/L, e.g., about 2.0 mol/L, and a pH of about 0.01-3. The acid in the first acid solution may be any conventional inorganic acid and/or organic acid, and for example, may be at least one selected from the group consisting of phosphoric acid, sulfuric acid, nitric acid, hydrochloric acid, acetic acid, citric acid, tartaric acid, formic acid, and acetic acid, and preferably selected from sulfuric acid and nitric acid.

In some preferred embodiments according to the present application, in step c), the second slurry is heated to about 50-85° C., e.g., about 80° C., and then the second acid solution is continuously added to the second slurry while maintaining the temperature until a desired pH of the acidified second slurry is obtained. The addition of the second acid solution may be as follows: the second acid solution is added to the second slurry at a rate of about 0.05-15 mol/h, preferably about 0.05-10 mol/h, more preferably about 2-8 mol/h, e.g., about 5 mol/h, calculated on the basis of $H^+$ and relative to 1 L of the second slurry. According to the present application, the acid is added at a relatively slow rate in the step c), so that the dealumination process is more moderate, which is beneficial to the improvement of the performance of the molecular sieve.

In some preferred embodiments according to the present application, in step c), the addition of the second acid solution may be performed for a plurality of times (e.g., 1 to 5 times), the resultant may be allowed to react at a constant temperature for a period of time after each acid addition, and then a next acid addition may be performed, until a pH of the acidified second slurry within the desired range is obtained. The second acid solution may have an acid concentration of about 0.1-15.0 mol/L, preferably about 0.1-5.0 mol/L, e.g., about 2.0 mol/L, and a pH of about 0.01-3. The acid in the second acid solution may be any conventional inorganic acid and/or organic acid, and for example, may be at least one selected from the group consisting of phosphoric acid, sulfuric acid, nitric acid, hydrochloric acid, acetic acid, citric acid, tartaric acid, formic acid, and acetic acid, and preferably selected from sulfuric acid and nitric acid. The second acid solution and the first acid solution may be the same or different in type and concentration, and preferably are the same acid solution.

In some preferred embodiments according to the present application, the method may further comprise the steps of: collecting the second solid product, and then washing with water and drying to obtain the phosphorus-containing high-silica molecular sieve. The water washing and drying are conventional procedures involved in the preparation of molecular sieves, and there is no particular limitation in the present application. For example, the drying may be performed using an oven, a mesh belt, a converter, or the like, and the drying conditions may include: a temperature of about 50-350° C., preferably about 70-200° C., e.g., about 180° C.; a drying time of about 1-24 hours, preferably about 2-6 hours, e.g., about 3 hours.

In the present application, a phosphorus-containing molecular sieve starting material is subjected to a specific hydrothermal treatment and two stages of acid treatment, so that a phosphorus-containing high-silica molecular sieve with novel structural features can be obtained.

The phosphorus-containing high-silica molecular sieve according to the present application can be used in various acidic catalysts useful for catalytic cracking, hydroisomerization, alkylation, hydrocracking and other reactions, and is particularly suitable for use in the hydrocracking of hydrocarbon feedstocks to produce hydrocarbon fractions with lower boiling points and lower molecular weights.

Thus, in a third aspect, the present application provides the use of a phosphorus-containing high-silica molecular sieve according to the present application in the hydrocracking of hydrocarbon feedstocks, comprising a step of contacting a hydrocarbon feedstock with a hydrocracking catalyst comprising said phosphorus-containing high-silica molecular sieve.

According to the present application, the hydrocarbon feedstock may be selected from various heavy mineral oils or synthetic oils, or mixed distillates thereof, such as straight run gas oils, vacuum gas oils, demetalized oils, atmospheric residues, deasphalted vacuum residues, coker distillates, catalytic cracker distillates, shale oils, tar sand oils, coal liquid, and the like.

Particularly, the catalyst based on the phosphorus-containing high-silica molecular sieve of the present application is particularly suitable for used in the hydrocracking of heavy and inferior distillates to produce a middle distillate having a distillation range of about 149-371° C., especially about 180-370° C.

According to the present application, the hydrocracking reaction may be one or more of hydrocracking reactions carried out in conventional equipment such as fixed bed, ebullated bed, slurry bed, suspended bed reactors and the like.

According to the present application, when the catalyst based on the phosphorus-containing high-silica molecular sieve of the present application is used in the hydrocracking of distillate oils, the catalyst may be used under conventional hydrocracking conditions. For example, the hydrocracking conditions may include: a reaction temperature of about 200-650° C., preferably about 300-510° C., a reaction pressure of about 3-24 MPa, preferably about 4-15 MPa, a liquid hourly space velocity of about 0.1-50 $h^{-1}$, preferably about 0.2-30 $h^{-1}$, and a hydrogen-to-oil volume ratio of about 100-5000.

In a fourth aspect, the present application provides a hydrocracking catalyst comprising, based on the dry weight of the catalyst, about 45-90 wt %, e.g., about 60-90 wt %, of a carrier, calculated on a dry basis; about 1-40 wt %, e.g., about 5-35 wt %, of a first metal component, calculated as metal oxides; and about 1-15 wt %, e.g., about 2-12 wt %, of a second metal component, calculated as metal oxides, wherein the carrier comprises a phosphorus-containing high-silica molecular sieve according to the present application and a refractory inorganic oxide in a weight ratio of about 0.03:1 to about 20:1, for example about 0.05:1 to about 19:1; the first metal component comprises a Group VIB metal; and the second metal component comprises a Group VIII metal.

According to the present application, the refractory inorganic oxide can be used for improving the strength of the catalyst and improving and adjusting the physicochemical properties of the catalyst, such as improving the pore structure of the catalyst. In some embodiments, the refractory inorganic oxide may be any inorganic oxides commonly used in the carrier of hydrogenation catalysts, such as alumina, silica, titania, zirconia, magnesia, thoria, beryllia, boria, cadmium oxide, and the like. In a preferred embodiment of the present application, the refractory inorganic oxide is alumina, and the alumina may include hydrargillites such as gibbsite, bayeritenordstrandite and monohydrate bauxite such as boehmite, diaspor, pseudo-boehmite.

In preferred embodiments according to the present application, the first metal component is selected from the group consisting of molybdenum components, tungsten components, and any combination thereof; and/or, the second metal component is selected from the group consisting of iron components, nickel components, cobalt components, and any combination thereof.

In a fifth aspect, the present application provides a method for preparing a hydrocracking catalyst of the present application, comprising the steps of:

i) mixing a phosphorus-containing high-silica molecular sieve according to the present application with a refractory inorganic oxide to produce a carrier; and ii) contacting the carrier with an impregnation solution containing a first metal precursor and a second metal precursor for impregnation.

In the present application, the contacting and impregnation of the carrier with the impregnation solution may be carried out by any method known in the art, such as the method disclosed in Chinese patent No. ZL200810241082.3, which comprises loading a Group VIB metal component, a Group VIII metal component and an organic additive on the catalyst carrier.

Methods for preparing the carrier are well known in the art, and there is no particular limitation in the present application. For example, the method may comprise the steps of: mixing a phosphorus-containing high-silica molecular sieve according to the present application with a refractory inorganic oxide, and then shaping and drying to obtain the carrier. The shaping may be performed by various conventional methods, such as tableting molding, rolling ball molding or extrusion molding.

The shape of the carrier is not particularly limited in the present application, and may be sphere, strip, hollow strip, hollow sphere, block, or the like, and the strip-shaped carrier may have a multilobal shape, such as a trilobal shape, a quatrefoil shape, or the like, or a modified form thereof.

In some embodiments according to the present application, the first metal precursor is a compound comprising the first metal that is soluble in the impregnation solution, including but not limited to at least one selected from inorganic acids of the first metal, inorganic salts of the first metal, oxides of the first metal, and metal-organic compounds of the first metal; the inorganic salt may be at least one selected from the group consisting of nitrate, carbonate, basic carbonate, hypophosphite, phosphate, sulfate, and chloride; the organic substituent in the metal-organic compound of the first metal may be at least one selected from the group consisting of hydroxyl group, carboxyl group, amino group, ketone group, ether group and alkyl group. For example, when the first metal is molybdenum, the first metal precursor may be at least one selected from the group consisting of molybdic acid, paramolybdic acid, molybdate, paramolybdate, and molybdenum oxide; and when the first metal is tungsten, the first metal precursor may be at least one selected from the group consisting of tungstic acid, metatungstic acid, ethyl metatungstic acid, tungstate, metatungstate and ethyl metatungstate.

In some embodiments according to the present application, the second metal precursor is a compound comprising the second metal that is soluble in the impregnating solution, including but not limited to at least one selected from inorganic acids of the second metal, inorganic salts of the second metal, oxides of the second metal, and metal-organic compounds of the second metal; the inorganic salt may be at least one selected from the group consisting of nitrate, carbonate, basic carbonate, hypophosphite, phosphate, sulfate, and chloride; and the organic substituent in the metal-organic compound of the second metal may be at least one selected from the group consisting of hydroxyl group, carboxyl group, amino group, ketone group, ether group and alkyl group.

In some embodiments according to the present application, the impregnation solution may further comprise an organic additive, which may be present in an amount of about 2-300 g/L. The organic additive may be an oxygen-containing organic compound and/or a nitrogen-containing organic compound. Particularly, the oxygen-containing organic compound may be at least one selected from the group consisting of ethylene glycol, glycerol, polyethylene glycol (with a molecular weight that may be about 200-1500), diethylene glycol, butanediol, acetic acid, maleic acid, oxalic acid, nitrilotriacetic acid, 1,2-cyclohexanediaminetetraacetic acid, citric acid, tartaric acid, and malic acid; the nitrogen-containing organic compound may be at least one selected from the group consisting of ethylenediamine, diethylenetriamine, cyclohexanediaminetetraacetic acid, glycine, nitrilotriacetic acid, ethylenediaminetetraacetic acid and ammonium ethylenediaminetetraacetate.

In the method for preparing a hydrocracking catalyst of the present application, the temperature for the contacting and impregnation is not particularly limited, and may be various temperatures that can be attained by the impregnation solution used. The time for impregnation is also not particularly limited as long as the catalyst carrier can be loaded with the desired amount of the precursor of the metallic active component. Generally, the higher the impregnation temperature and concentration of the impregnating solution, the shorter the time required to achieve the same impregnation amount (i.e., the weight difference between the catalyst carrier after impregnation and the catalyst carrier before impregnation); and vice versa. Where the desired impregnation amount and conditions are selected, an appropriate impregnation time can be easily determined by one skilled in the art in view of the disclosure herein.

The impregnation method is not particularly limited as well, and the impregnation may be a saturated impregnation or a supersaturated impregnation. The environment of the impregnation is not particularly limited and the impregnation may be performed under sealed conditions or in an open environment according to conventional methods, and the loss of the aqueous solvent during the impregnation may or may not be replenished. Various gases, such as air, nitrogen, steam, etc., may be introduced, or no new component is introduced during the impregnation process.

In some embodiments, the method for preparing a hydrocracking catalyst of the present application may further comprise a step of drying and calcining the impregnated material, which step is conventionally used for preparing catalysts, and is not particularly limited in the present application. For example, the drying conditions may include: a temperature of about 80-350° C., preferably about 100-300° C., and a drying time of about 0.5-24 h, preferably about 1-12 h. The calcining conditions may comprise: a temperature of about 350-600° C., preferably about 400-550° C.; and a calcining time of about 0.2-12 h, preferably about 1-10 h.

The hydrocracking catalyst according to the present application can be used as an acidic catalyst for catalytic cracking, hydroisomerization, alkylation, hydrocracking and other reactions, and is particularly suitable for use in the hydrocracking of hydrocarbon feedstocks to produce hydrocarbon fractions with lower boiling points and lower molecular weights.

Thus, in a sixth aspect, the present application provides the use of a hydrocracking catalyst according to the present application in the hydrocracking of hydrocarbon feedstocks, comprising a step of contacting a hydrocarbon feedstock with said hydrocracking catalyst.

According to the present application, the hydrocarbon feedstock may be selected from various heavy mineral oils or synthetic oils, or mixed distillates thereof, such as straight run gas oils, vacuum gas oils, demetalized oils, atmospheric residues, deasphalted vacuum residues, coker distillates, catalytic cracker distillates, shale oils, tar sand oils, coal liquids, and the like.

Particularly, the catalyst according to the present application can be used in the hydrocracking of heavy and inferior distillates to produce a middle distillate with a distillation range of about 149-371° C., especially about 180-370° C.

When used in the hydrocracking of hydrocarbon feedstocks, the hydrocracking catalyst according to the present application is preferably pre-sulfurized with sulfur, hydrogen sulfide or a sulfur-containing feedstock in the presence of hydrogen at a temperature of about 140-370° C. before use. The pre-sulfurization may be carried out outside the reactor or in situ in the reactor so as to convert the catalyst into a sulfide form.

When the catalyst according to the present application is used in the hydrocracking of distillates, the catalyst can be used under conventional hydrocracking conditions. For example, the conditions for the hydrocracking reaction may include: a reaction temperature of about 200-650° C., preferably about 300-510° C.; a reaction pressure of about 3-24 MPa, preferably about 4-15 MPa; a liquid hourly space velocity of about 0.1-50 $h^{-1}$, preferably about 0.2-30 $h^{-1}$; and a hydrogen-to-oil volume ratio of about 100-5000.

The hydrocracking reaction may be carried out in any equipment allowing the contact and reaction of the hydrocarbon feedstock with the catalyst under hydrogenation conditions, which may be, for example, a fixed bed, moving bed, ebullating bed, or slurry bed reactor.

In preferred embodiments, the present application provides the following technical solutions:

A1, a phosphorus-containing high-silica molecular sieve, comprising about 90-99.8 wt % of silicon, about 0.1-

9.0 wt % of aluminum, and about 0.01-2.5 wt % of phosphorus, calculated as oxides and based on the dry weight of the molecular sieve,
wherein the molecular sieve has an XRD pattern with at least three diffraction peaks, the first strong peak is present at a diffraction angle of about 5.9-6.9°, the second strong peak is present at a diffraction angle of about 10.0-11.0°, the third strong peak is present at a diffraction angle of about 15.6-16.7°,
preferably, the molecular sieve has a pore volume of about 0.20-0.50 mL/g and a specific surface area of about 260-600 m$^2$/g.

A2, the phosphorus-containing high-silica molecular sieve according to Item A1, wherein in the XRD pattern of the molecular sieve, the first strong peak is present at a diffraction angle of about 6.1-6.8°, the second strong peak is present at a diffraction angle of about 10.2-10.7°, and the third strong peak is present at a diffraction angle of about 15.8-16.5°.

A3, the phosphorus-containing high-silica molecular sieve according to any one of the preceding Items, wherein in the XRD pattern of the molecular sieve, $I_1/I_{23.5-24.5}°$ is about 3.0-11.0, $I_2/I_{23.5-24.5}°$ is about 2.9-7.0, $I_3/I_{23.5-24.5}°$ is about 1.0-4.0, wherein $I_1$ represents the peak height of the first strong peak, $I_2$ represents the peak height of the second strong peak, $I_3$ represents the peak height of the third strong peak, and $I_{23.5-24.5}°$ represents the peak height of the peak at a diffraction angle of about 23.5-24.5°.

A4, the phosphorus-containing high-silica molecular sieve according to any one of the preceding Items, wherein the molecular sieve has an XRD pattern with at least five diffraction peaks, wherein the fourth strong peak is present at a diffraction angle of about 20.4-21.6° and the fifth strong peak is present at a diffraction angle of about 11.8-12.8°.

A5, the phosphorus-containing high-silica molecular sieve according to Item A4, wherein, in the XRD pattern of the molecular sieve, the fourth strong peak is present at a diffraction angle of about 20.8-21.4° and the fifth strong peak is present at a diffraction angle of about 12.1-12.6°; and/or
$I_4/I_{23.5-24.5}°$ is about 1.0-4.0, and $I_5/I_{23.5-24.5}°$ is about 1.0-2.0, wherein $I_4$ represents the peak height of the fourth strong peak, $I_5$ represents the peak height of the fifth strong peak, and $I_{23.5-24.5}°$ represents the peak height of the peak at a diffraction angle of about 23.5-24.5°.

A6, a method for preparing a phosphorus-containing high-silica molecular sieve, comprising the steps of:
a) subjecting a phosphorus-containing molecular sieve starting material to a hydrothermal treatment at a temperature of about 350-700° C., a pressure of about 0.1-8.0 MPa and in the presence of steam for about 0.5-10 h to obtain a hydrothermally treated molecular sieve material; the phosphorus-containing molecular sieve starting material has a phosphorus content of about 0.1-15 wt %, a sodium content of about 0.5-4.5 wt %, a silicon content of about 70-85 wt %, and an aluminum content of about 16.0-21.0 wt %, calculated as oxides and based on the dry weight of the phosphorus-containing molecular sieve starting material;
b) adding water to the hydrothermally treated molecular sieve material obtained in the step a) and slurrying to obtain a first slurry, heating the first slurry to about 40-95° C., preferably about 50-85° C., then adding a first acid solution into the first slurry while maintaining the temperature, wherein the first acid solution is added in an amount such that the acidified first slurry has a pH value of about 2.5-4, reacting at a constant temperature for about 0.5-20 h, and collecting a first solid product; and
c) adding water to the first solid product obtained in the step b) and slurrying to obtain a second slurry, heating the second slurry to about 40-95° C., preferably about 50-85° C., then adding a second acid solution into the second slurry while maintaining the temperature, wherein the second acid solution is added in an amount such that the acidified second slurry has a pH value of about 1.0-2.0, reacting at a constant temperature for about 0.5-20 h, and collecting a second solid product.

A7, the method according to Item A6, wherein in step a), the phosphorus-containing molecular sieve starting material is a phosphorus-containing Y molecular sieve having a lattice constant of about 2.425-2.47 nm, a specific surface area of about 250-750 m$^2$/g, and a pore volume of about 0.2-0.95 mL/g.

A8, the method according to Item A6 or A7, wherein in step b), the ratio of the weight of water in the first slurry to the dry weight of the phosphorus-containing molecular sieve starting material is about 14:1 to about 5:1.

A9, the method according to any one of Items A6 to A8, wherein in step c), the ratio of the weight of water in the second slurry to the dry weight of the phosphorus-containing molecular sieve starting material is about 0.5:1 to about 20:1.

A10, the method according to any one of Items A6 to A9, wherein in step c), the addition of the second acid solution is performed by adding the second acid solution to the second slurry at a rate of about 0.05-15 mol/h, preferably about 0.05-10 mol/h, more preferably about 2-8 mol/h, calculated on the basis of H$^+$ and relative to 1 L of the second slurry.

A11, the method according to any one of Items A6 to A10, wherein in step b), the first acid solution has an acid concentration of about 0.01-15.0 mol/L, preferably about 0.1-5.0 mol/L, and the acid in the first acid solution is at least one selected from the group consisting of phosphoric acid, sulfuric acid, nitric acid, hydrochloric acid, acetic acid, citric acid, tartaric acid, formic acid and acetic acid, preferably selected from sulfuric acid and nitric acid; and/or
in step c), the second acid solution has an acid concentration of about 0.01-15.0 mol/L, preferably about 0.1-5.0 mol/L, and the acid in the second acid solution is at least one selected from the group consisting of phosphoric acid, sulfuric acid, nitric acid, hydrochloric acid, acetic acid, citric acid, tartaric acid, formic acid and acetic acid, preferably selected from sulfuric acid and nitric acid.

A12, the method according to any one of Items A6 to A11, further comprising: collecting the second solid product, then washing with water, and drying to obtain the phosphorus-containing high-silica molecular sieve; preferably, the drying conditions include: a temperature of about 50-350° C., preferably about 70-200° C.; and a drying time of about 1-24 h, preferably about 2-6 h.

A13, a phosphorus-containing high-silica molecular sieve prepared by the method according to any one of Items A6 to A12.

A14, use of a phosphorus-containing high-silica molecular sieve according to any one of Items A1-A5 and A13 in the hydrocracking of hydrocarbon feedstocks.

A15, the use according to Item A14, wherein the hydrocarbon feedstock is selected from the group consisting of straight-run gas oils, vacuum gas oils, demetallized oils, atmospheric residues, deasphalted vacuum residues, coker distillates, catalytic cracked distillates, shale oils, tar sand oils, coal liquids, or a combination of two or more thereof; and/or conditions for the hydrocracking reaction include: a reaction temperature of about 200-650° C., preferably about 300-510° C.; a reaction pressure of about 3-24 MPa, preferably about 4-15 MPa; a liquid hourly space velocity of about 0.1-50 $h^{-1}$, preferably about 0.2-30 $h^{-1}$; and a hydrogen-to-oil volume ratio of about 100-5000.

A16, a hydrocracking catalyst, comprising, based on the dry weight of the catalyst, about 45-90 wt % of a carrier calculate on a dry basis, about 1-40 wt % of a first metal component calculated as metal oxides, and about 1-15 wt % of a second metal component calculated as metal oxides;

the carrier comprises a phosphorus-containing high-silica molecular sieve and a refractory inorganic oxide, wherein the weight ratio of the phosphorus-containing high-silica molecular sieve to the refractory inorganic oxide is about 0.03:1 to about 20:1;

wherein the first metal component comprises a Group VIB metal; and the second metal component comprises a Group VIII metal; and the phosphorus-containing high-silica molecular sieve comprises about 90-99.8 wt % of silicon, about 0.1-9.0 wt % of aluminum and about 0.01-2.5 wt % of phosphorus, calculated as oxides and based on the dry weight of the molecular sieve, and the phosphorus-containing high-silica molecular sieve has an XRD pattern with at least three diffraction peaks, wherein the first strong peak is present at a diffraction angle of about 5.9-6.9°, the second strong peak is present at a diffraction angle of about 10.0-11.0°, and the third strong peak is present at a diffraction angle of about 15.6-16.7°, preferably, the phosphorus-containing high-silica molecular sieve has a pore volume of about 0.20-0.50 mL/g and a specific surface area of about 260-600 $m^2/g$.

A17, the hydrocracking catalyst according to Item A16, wherein, in the XRD pattern of the phosphorus-containing high-silica molecular sieve, the first strong peak is present at a diffraction angle of about 6.1-6.8°, the second strong peak is present at a diffraction angle of about 10.2-10.7°, and the third strong peak is present at a diffraction angle of about 15.8-16.5°.

A18. the hydrocracking catalyst according to Item A16 or A17, wherein in the XRD pattern of the phosphorus-containing high-silica molecular sieve, $I_1/I_{23.5-24.5}°$ is about 3.0-11.0, $I_2/I_{23.5-24.5}°$ is about 2.9-7.0, and $I_3/I_{23.5-24.5}°$ is about 1.0-4.0, where $I_1$ represents the peak height of the first strong peak, $I_2$ represents the peak height of the second strong peak, $I_3$ represents the peak height of the third strong peak, and $I_{23.5-24.5}°$ represents the peak height of the peak at a diffraction angle of about 23.5-24.5°.

A19, the hydrocracking catalyst according to any one of Items A16 to A18, wherein the phosphorous-containing high-silica molecular sieve has an XRD pattern with at least five diffraction peaks, wherein the fourth strong peak is present at a diffraction angle of about 20.4-21.6° and the fifth strong peak is present at a diffraction angle of about 11.8-12.8°.

A20, the hydrocracking catalyst according to Item A19, wherein in the XRD pattern of the phosphorus-containing high-silica molecular sieve, the fourth strong peak is present at a diffraction angle of about 20.8-21.4° and the fifth strong peak is present at a diffraction angle of about 12.1-12.6°; and/or $I_4/I_{23.5-24.5}°$ is about 1.0-4.0, and $I_5/I_{23.5-24.5}°$ is about 1.0-2.0, wherein $I_4$ represents the peak height of the fourth strong peak, $I_5$ represents the peak height of the fifth strong peak, and $I_{23.5-24.5}°$ represents the peak height of the peak at a diffraction angle of about 23.5-24.5°.

A21, the hydrocracking catalyst according to any one of Items A16 to A20, wherein the phosphorus-containing high-silica molecular sieve is prepared by a method comprising the steps of:

a) subjecting a phosphorus-containing molecular sieve starting material to a hydrothermal treatment at a temperature of about 350-700° C., a pressure of about 0.1-8.0 MPa and in the presence of steam for about 0.5-10 h to obtain a hydrothermally treated molecular sieve material; the phosphorus-containing molecular sieve starting material has a phosphorus content of about 0.1-15 wt %, a sodium content of about 0.5-4.5 wt %, a silicon content of about 70-85 wt %, and an aluminum content of about 16.0-21.0 wt %, calculated as oxides and based on the dry weight of the phosphorus-containing molecular sieve starting material;

b) adding water to the hydrothermally treated molecular sieve material obtained in the step a) and slurrying to obtain a first slurry, heating the first slurry to about 40-95° C., preferably about 50-85° C., then adding a first acid solution into the first slurry while maintaining the temperature, wherein the first acid solution is added in an amount such that the acidified first slurry has a pH value of about 2.5-4, reacting at a constant temperature for about 0.5-20 h, and collecting a first solid product; and c) adding water to the first solid product obtained in the step b) and slurrying to obtain a second slurry, heating the second slurry to about 40-95° C., preferably about 50-85° C., then adding a second acid solution into the second slurry while maintaining the temperature, wherein the second acid solution is added in an amount such that the acidified second slurry has a pH value of about 1.0-2.0, reacting at a constant temperature for about 0.5-20 h, and collecting a second solid product.

A22, the hydrocracking catalyst according to Item A21, wherein in step a), the phosphorus-containing molecular sieve starting material is a phosphorus-containing Y molecular sieve having a lattice constant of about 2.425-2.47 nm, a specific surface area of about 250-750 $m^2/g$, and a pore volume of about 0.2-0.95 mL/g.

A23, the hydrocracking catalyst according to Item A21 or A22, wherein in step b) the ratio of the weight of water in the first slurry to the dry weight of the phosphorus-containing molecular sieve starting material is from about 14:1 to about 5:1.

A24, the hydrocracking catalyst according to any one of Items A21 to A23, wherein in step c), the ratio of the weight of water in the second slurry to the dry weight of the phosphorus-containing molecular sieve starting material is from about 0.5:1 to about 20:1.

A25, the hydrocracking catalyst according to any one of Items A21 to A24, wherein in step c), the addition of the second acid solution is performed by adding the second acid solution to the second slurry at a rate of about 0.05-15 mol/h, preferably about 0.05-10 mol/h, more preferably about 2-8 mol/h, calculated on the basis of $H^+$ and relative to 1 L of the second slurry.

A26, the hydrocracking catalyst according to any one of Items A21 to A25, wherein in step b), the first acid solution has an acid concentration of about 0.01-15.0 mol/L, preferably about 0.1-5.0 mol/L, and the acid in the first acid solution is at least one selected from the group consisting of phosphoric acid, sulfuric acid, nitric acid, hydrochloric acid, acetic acid, citric acid, tartaric acid, formic acid and acetic acid, preferably selected from sulfuric acid and nitric acid; and/or in step c), the second acid solution has an acid concentration of about 0.01-15.0 mol/L, preferably about 0.1-5.0 mol/L, and the acid in the second acid solution is at least one selected from the group consisting of phosphoric acid, sulfuric acid, nitric acid, hydrochloric acid, acetic acid, citric acid, tartaric acid, formic acid and acetic acid, preferably selected from sulfuric acid and nitric acid.

A27, the hydrocracking catalyst according to any one of Items A21 to A26, wherein the method for preparing the phosphorus-containing high-silica molecular sieve further comprises the steps of: collecting the second solid product, then washing with water, and drying to obtain the phosphorus-containing high-silica molecular sieve; preferably, the drying conditions include: a temperature of about 50-350° C., preferably about 70-200° C.; and a drying time of about 1-24 h, preferably about 2-6 h.

A28, the hydrocracking catalyst according to any one of Items A21 to A27, wherein the refractory inorganic oxide is selected from the group consisting of alumina, silica, titania, zirconia, magnesia, thoria, beryllia, boria, cadmium oxide, or a combination of two or more thereof; and/or the first metal component is a molybdenum component and/or a tungsten component; and the second metal component is an iron component, a nickel component, a cobalt component, or a combination of two or more thereof.

A29, a method for preparing a hydrocracking catalyst according to any one of Items A16 to A28, comprising a step of contacting a carrier with an impregnation solution containing a first metal precursor and a second metal precursor for impregnation, wherein the carrier comprises the phosphorus-containing high-silica molecular sieve and a refractory inorganic oxide.

A30, the method according to Item A29, further comprising the steps of mixing the phosphorous containing high-silica molecular sieve with a refractory inorganic oxide, then shaping, drying, and calcining to obtain the carrier.

A31, the method according to Items A29 or A30, wherein the first metal precursor is an inorganic acid of the first metal, an inorganic salt of the first metal or a metal-organic compound of the first metal; wherein the inorganic salt is at least one selected from the group consisting of nitrate, carbonate, basic carbonate, hypophosphite, phosphate, sulfate and chloride; the organic substituent in the metal-organic compound of the first metal is at least one selected from the group consisting of hydroxyl group, carboxyl group, amino group, ketone group, ether group and alkyl group; and/or the second metal precursor is an inorganic acid of the second metal, an inorganic salt of the second metal or a metal-organic compound of the second metal; wherein the inorganic salt is at least one selected from the group consisting of nitrate, carbonate, basic carbonate, hypophosphite, phosphate, sulfate and chloride; the organic substituent in the metal-organic compound of the second metal is at least one selected from the group consisting of hydroxyl group, carboxyl group, amino group, ketone group, ether group and alkyl group.

A32, the method according to any one of Items A29 to A31, further comprising the steps of drying and calcining the impregnated material;

preferably, the drying conditions include: a temperature of about 80-350° C., preferably about 100-300° C., and a drying time of about 0.5-24 hours, preferably about 1-12 hours; and/or preferably, the calcining conditions include: a temperature of about 350-600° C., preferably about 400-550° C., and a calcining time of about 0.2-12 h, preferably about 1-10 h.

A33, Use of a hydrocracking catalyst according to any one of Items A16 to A28 in the hydrocracking of hydrocarbon feedstocks.

A34, the use according to Item A33, wherein the hydrocarbon feedstock is selected from the group consisting of straight-run gas oils, vacuum gas oils, demetallized oils, atmospheric residues, deasphalted vacuum residues, coker distillates, catalytic cracked distillates, shale oils, tar sand oils, coal liquids, or a combination of two or more thereof; and/or conditions for the hydrocracking reaction include: a reaction temperature of about 200-650° C., preferably about 300-510° C.; a reaction pressure of about 3-24 MPa, preferably about 4-15 MPa; a liquid hourly space velocity of about 0.1-50 h$^{-1}$, preferably about 0.2-30 h$^{-1}$; and a hydrogen-to-oil volume ratio of about 100-5000.

B1, a phosphorus-containing high-silica molecular sieve, characterized in that the molecular sieve has a pore volume of about 0.20-0.50 mL/g, a specific surface area of about 260-600 m$^2$/g, and the molecular sieve has a silicon content of about 90-99.8 wt %, an aluminum content of about 0.1-9.0 wt %, and a phosphorus content of about 0.01-2.5 wt %, calculated as oxides and based on the dry weight of the molecular sieve;

the molecular sieve has an XRD pattern with a first strong peak at a diffraction angle of about 5.9-6.9°, a second strong peak at a diffraction angle of about 10.0-11.0°, and a third strong peak at a diffraction angle of about 15.6-16.7°.

B2, the molecular sieve according to Item B1, wherein the molecular sieve has an XRD pattern with a first strong peak at a diffraction angle of about 6.1-6.8°, a second strong peak at a diffraction angle of about 10.2-10.7°, and a third strong peak at a diffraction angle of about 15.8-16.5°.

B3. The molecular sieve according to Item B1 or B2, wherein in the XRD pattern of the molecular sieve, $I_1/I_{23.5-24.5}°$ is about 3.0-11.0, $I_2/I_{23.5-24.5}°$ is about 2.9-7.0, and $I_3/I_{23.5-24.5}°$ is about 1.0-4.0, where $I_1$ represents the peak height of the first strong peak, $I_2$ represents the peak height of the second strong peak, $I_3$ represents the peak height of the third strong peak, and $I_{23.5-24.5}°$ represents the peak height of the peak at a diffraction angle of about 23.5-24.5°.

B4, the molecular sieve according to Item B1 or B2, wherein the molecular sieve has an XRD pattern with a fourth strong peak at a diffraction angle of about 20.4-21.6° and a fifth strong peak at a diffraction angle of about 11.8-12.8°.

B5, the molecular sieve according to Item B4, wherein the molecular sieve has an XRD pattern with a fourth strong peak at a diffraction angle of about 20.8-21.4° and a fifth strong peak at a diffraction angle of about 12.1-12.6°; and/or $I_4/I_{23.5-24.5}°$ is about 1.0-4.0, $I_5/I_{23.5-24.5}°$ is about 1.0-2.0, wherein $I_4$ represents the peak height of the fourth strong peak, $I_5$ represents the peak height of the fifth strong peak, and $I_{23.5-24.5°}$ represents the peak height of the peak at a diffraction angle of about 23.5-24.5°.

B6, a method for preparing a phosphorus-containing high-silica molecular sieve according to any one of Items B1 to B5, comprising the steps of:
- a) subjecting a phosphorus-containing molecular sieve starting material to a hydrothermal treatment at a temperature of about 350-700° C., a pressure of about 0.1-2 MPa and in the presence of steam for about 0.5-10 h to obtain a hydrothermally treated molecular sieve material; the phosphorus-containing molecular sieve starting material has a phosphorus content of about 0.1-15 wt %, and a sodium content of about 0.5-4.5 wt %, calculated as oxides and based on the dry weight of the phosphorus-containing molecular sieve starting material;
- b) adding water to the hydrothermally treated molecular sieve material obtained in the step a) and slurrying to obtain a first slurry, heating the first slurry to about 40-95° C., then adding a first acid solution into the first slurry, while maintaining the temperature, in an amount such that the acidified first slurry has a pH value of about 2.5-4, reacting at a constant temperature for about 0.5-20 h, and collecting a first solid product;
- c) adding water to the first solid product obtained in the step b) and slurrying to obtain a second slurry, heating the second slurry to about 40-95° C., then continuously adding a second acid solution into the second slurry while maintaining the temperature, wherein the second acid solution is added in an amount such that the acidified second slurry has a pH value of about 1.0-2.0, reacting at a constant temperature for about 0.5-20 h, and collecting a second solid product.

B7, the method according to Item B6, wherein in step a), the phosphorus-containing molecular sieve starting material is a phosphorus-containing Y molecular sieve having a lattice constant of about 2.425-2.47 nm, a specific surface area of about 250-750 m²/g, and a pore volume of about 0.2-0.95 mL/g.

B8, the method according to Item B6, wherein in step b), the ratio of the weight of water in the first slurry to the dry weight of the phosphorus-containing molecular sieve starting material is from about 14:1 to about 5:1.

B9, the method according to Item B6, wherein in step c), the ratio of the weight of water in the second slurry to the dry weight of the phosphorus-containing molecular sieve starting material is from about 0.5:1 to about 20:1.

B10, the method according to Item B6, wherein in step c), the addition of the second acid solution is performed by adding the second acid solution to the second slurry at a rate of about 0.05-10 mol/h, calculated on the basis of H⁺ and relative to 1 L of the second slurry.

B11, the method according to Item B6, wherein in step b), the first acid solution has an acid concentration of about 0.01-15.0 mol/L, the acid in the first acid solution is at least one selected from the group consisting of phosphoric acid, sulfuric acid, nitric acid, hydrochloric acid, acetic acid, citric acid, tartaric acid, formic acid and acetic acid; and/or in step c), the second acid solution has an acid concentration of about 0.01-15.0 mol/L, and the acid in the second acid solution is at least one selected from the group consisting of phosphoric acid, sulfuric acid, nitric acid, hydrochloric acid, acetic acid, citric acid, tartaric acid, formic acid and acetic acid.

B12, the method according to Item B6, wherein the method further comprises: collecting the second solid product, then washing with water, and drying to obtain a phosphorus-containing silicon-aluminum molecular sieve; and/or the drying conditions include: a temperature of about 50-350° C., preferably about 70-200° C.; and a drying time of about 1-24 hours, preferably about 2-6 hours.

B13 use of a phosphorus-containing high-silica molecular sieve according to any one of Items B1 to B5 in the hydrocracking of hydrocarbon feedstocks.

B14, the use according to Item B13, wherein the hydrocarbon feedstock is selected from the group consisting of straight-run gas oils, vacuum gas oils, demetallized oils, atmospheric residues, deasphalted vacuum residues, coker distillates, catalytic cracked distillates, shale oils, tar sand oils, coal liquids, or a combination of two or more thereof; and/or
  conditions for the hydrocracking reaction include: a reaction temperature of about 200-650° C., preferably about 300-510° C.; a reaction pressure of about 3-24 MPa, preferably about 4-15 MPa; a liquid hourly space velocity of about 0.1-50 h⁻¹, preferably about 0.2-30 h⁻¹; and a hydrogen-to-oil volume ratio of about 100-5000.

C1, a hydrocracking catalyst, characterized in that the catalyst comprises, based on the dry weight of the catalyst, 45-90 wt % of a carrier, calculated on a dry basis; 1-40 wt % of a first metal component, calculated as metal oxides; and 1-15 wt % of a second metal component, calculated as metal oxides;
  the carrier comprises a phosphorus-containing high-silica molecular sieve and a refractory inorganic oxide, wherein the weight ratio of the phosphorus-containing high-silica molecular sieve to the refractory inorganic oxide is about 0.03:1 to about 20:1; the first metal component is a metal component selected from Group VIB metals; the second metal component is a metal component selected from Group VIII metals;
  the phosphorus-containing high-silica molecular sieve has a pore volume of about 0.20-0.50 mL/g, a specific surface area of about 260-600 m²/g, and the phosphorus-containing high-silica molecular sieve has a silicon content of about 90-99.8 wt %, an aluminum content of about 0.1-9.0 wt % and a phosphorus content of about 0.01-2.5 wt %, calculated as oxides and based on the dry weight of the molecular sieve; and the phosphorus-containing high-silica molecular sieve has an XRD pattern with a first strong peak at a diffraction angle of about 5.9-6.9°, a second strong peak at a diffraction angle of about 10.0-11.0°, and a third strong peak at a diffraction angle of about 15.6-16.7°.

C2, the catalyst according to Item C1, wherein the phosphorus-containing high-silica molecular sieve has an XRD pattern with a first strong peak at a diffraction angle of about 6.1-6.8°, a second strong peak at a diffraction angle of about 10.2-10.7°, and a third strong peak at a diffraction angle of about 15.8-16.5°.

C3. the catalyst according to Item C1 or C2, wherein in the XRD pattern of the phosphorus-containing high silica molecular sieve, $I_1/I_{23.5-24.5°}$ is about 3.0-11.0, $I_2/I_{23.5-24.5°}$ is about 2.9-7.0, and $I_3/I_{23.5-24.5°}$ is about 1.0-4.0, where $I_1$ represents the peak height of the first strong peak, $I_2$ represents the peak height of the second strong peak, $I_3$ represents the peak height of the third strong peak, and $I_{23.5-24.5°}$ represents the peak height of the peak at a diffraction angle of about 23.5-24.5°.

C4, the catalyst according to Item C1 or C2, wherein the phosphorous-containing high-silica molecular sieve has an XRD pattern with a fourth strong peak at a diffraction angle of about 20.4-21.6° and a fifth strong peak at a diffraction angle of about 11.8-12.8°.

C5, the catalyst according to Item C4, wherein the phosphorus-containing high-silica molecular sieve has a XRD pattern with a fourth strong peak at a diffraction angle of about 20.8-21.4° and a fifth strong peak at a diffraction angle of about 12.1-12.6°; and/or $I_4/I_{23.5-24.5}°$ is about 1.0-4.0, and $I_5/I_{23.5-24.5}°$ is about 1.0-2.0, wherein $I_4$ represents the peak height of the fourth strong peak, 15 represents the peak height of the fifth strong peak, and $I_{23.5-24.5}°$ represents the peak height of the peak at a diffraction angle of about 23.5-24.5°.

C6, the catalyst according to Item C1 or C2, wherein the phosphorus-containing high-silica molecular sieve is prepared by a method comprising the steps of:
  a) subjecting a phosphorus-containing molecular sieve starting material to a hydrothermal treatment at a temperature of about 350-700° C., a pressure of about 0.1-2 MPa and in the presence of steam for about 0.5-10 h to obtain a hydrothermally treated molecular sieve material; the phosphorus-containing molecular sieve starting material has a phosphorus content of about 0.1-15 wt %, and a sodium content of about 0.5-4.5 wt %, calculated as oxides and based on the dry weight of the phosphorus-containing molecular sieve starting material;
  b) adding water to the hydrothermally treated molecular sieve material obtained in the step a) and slurrying to obtain a first slurry, heating the first slurry to about 40-95° C., then adding a first acid solution into the first slurry, while maintaining the temperature, in an amount such that the acidified first slurry has a pH value of about 2.5-4, reacting at a constant temperature for about 0.5-20 h, and collecting a first solid product;
  c) adding water to the first solid product obtained in the step b) and slurrying to obtain a second slurry, heating the second slurry to about 40-95° C., then continuously adding a second acid solution into the second slurry while maintaining the temperature, wherein the second acid solution is added in an amount such that the acidified second slurry has a pH value of about 1.0-2.0, reacting at a constant temperature for about 0.5-20 h, and collecting a second solid product.

C7, the catalyst according to the Item C6, wherein in the step a), the phosphorus-containing molecular sieve starting material is a phosphorus-containing Y molecular sieve having a lattice constant of about 2.425-2.47 nm, a specific surface area of about 250-750 m²/g, and a pore volume of about 0.2-0.95 mL/g.

C8, the catalyst according to Item C6, wherein in step b), the ratio of the weight of water in the first slurry to the dry weight of the phosphorus-containing molecular sieve starting material is from about 14:1 to about 5:1.

C9, the catalyst according to Item C6, wherein in step c), the ratio of the weight of water in the second slurry to the dry weight of the phosphorus-containing molecular sieve starting material is from about 0.5:1 to about 20:1.

C10, the catalyst according to Item C6, wherein in step c), the addition of the second acid solution is performed by adding the second acid solution to the second slurry at a rate of about 0.05-10 mol/h, calculated on the basis of $H^+$ and relative to 1 L of the second slurry.

C11, the catalyst according to Item C6, wherein in step b), the first acid solution has an acid concentration of about 0.01-15.0 mol/L, the acid in the first acid solution is at least one selected from the group consisting of phosphoric acid, sulfuric acid, nitric acid, hydrochloric acid, acetic acid, citric acid, tartaric acid, formic acid, and acetic acid; and/or
  in step c), the second acid solution has an acid concentration of about 0.01-15.0 mol/L, and the acid in the second acid solution is at least one selected from the group consisting of phosphoric acid, sulfuric acid, nitric acid, hydrochloric acid, acetic acid, citric acid, tartaric acid, formic acid and acetic acid.

C12, the catalyst according to Item C6, wherein the method for preparing the phosphorus-containing high-silica molecular sieve further comprises the steps of: collecting the second solid product, then washing with water, and drying to obtain a phosphorus-containing high-silica molecular sieve; and/or the drying conditions include: a temperature of about 50-350° C., preferably about 70-200° C.; and a drying time of about 1-24 hours, preferably about 2-6 hours.

C13, the catalyst according to Item C1, wherein the refractory inorganic oxide is selected from the group consisting of alumina, silica, titania, zirconia, magnesia, thoria, beryllia, boria, or cadmium oxide, or a combination of two or three thereof; and/or
  the first metal component is a molybdenum component and/or a tungsten component; and the second metal component is an iron component, a nickel component, a cobalt component, or a combination of two or three thereof.

C14, a method for preparing a hydrocracking catalyst according to any one of Items C1 to C13, comprising a step of contacting a carrier with an impregnation solution containing a first metal precursor and a second metal precursor for impregnation.

C15, the process according to Item C14, wherein the method further comprises the steps of: mixing the phosphorus-containing high-silica molecular sieve with a refractory inorganic oxide, and then shaping, drying and calcining to obtain the carrier.

C16, the method according to Item C14, wherein the first metal precursor is an inorganic acid of the first metal, an inorganic salt of the first metal, or a metal-organic compound of the first metal; the inorganic salt is selected from the group consisting of nitrate, carbonate, basic carbonate, hypophosphite, phosphate, sulfate or chloride; the organic substituent in the metal-organic compound of the first metal is at least one selected from the group consisting of hydroxyl group, carboxyl group, amino group, ketone group, ether group and alkyl group; and/or
  the second metal precursor is an inorganic acid of the second metal, an inorganic salt of the second metal or a metal-organic compound of the second metal; the inorganic salt is selected from the group consisting of nitrate, carbonate, basic carbonate, hypophosphite, phosphate, sulfate or chloride; the organic substituent in the metal-organic compound of the second metal is at least one selected from the group consisting of hydroxyl group, carboxyl group, amino group, ketone group, ether group and alkyl group.

C17, the method according to Item C14, wherein the method further comprises the steps of drying and calcining the impregnated material; and/or
  the drying conditions include: a temperature of about 80-350° C., and a drying time of about 0.5-24 hours; and/or
  the calcining conditions include: a temperature of about 350-600° C., and a calcining time of about 0.2-12 h.

C18, use of a hydrocracking catalyst according to any one of Items C1-13 in the hydrocracking of hydrocarbon feedstocks.

C19, the use according to Item C18, wherein the hydrocarbon feedstock is selected from the group consisting of straight-run gas oils, vacuum gas oils, demetallized oils, atmospheric residues, deasphalted vacuum residues, coker distillates, catalytic cracked distillates, shale oils, tar sand oils, coal liquids, or a combination of two or more thereof; and/or conditions for the hydrocracking reaction include: a reaction temperature of about 200-650° C., preferably about 300-510° C.; a reaction pressure of about 3-24 MPa, preferably about 4-15 MPa; a liquid hourly space velocity of about 0.1-50 h$^{-1}$, preferably about 0.2-30 h$^{-1}$; and a hydrogen-to-oil volume ratio of about 100-5000.

EXAMPLES

The present application will be further illustrated with reference to the following examples, which are not intended to be limiting.

Apparatus and Method

In the following examples and comparative examples, the pore volume and specific surface area of the molecular sieve were measured by the low-temperature adsorption/desorption of nitrogen according to National Standard GB/T5816-1995 using ASAP 2400 Automatic Adsorption Apparatus from Micromeritics Instrument Corporation, USA. In particular, the molecular sieve to be detected was evacuated and degassed at 250° C. and 1.33 Pa for 4 h, and then contacted with an adsorbate, nitrogen, at −196° C. for static adsorption, until an adsorption balance was obtained; the amount of nitrogen adsorbed by the adsorbent was calculated based on the difference between the nitrogen gas inflow and the amount of nitrogen retained in the gas phase after adsorption, then the pore size distribution was calculated using a BJH equation, and the specific surface area and pore volume were calculated using a BET equation.

The crystal structure of the molecular sieve was determined using D5005 X-ray diffractometer from Siemens, Germany, according to Industry Standard SH/T0339-92. The experimental conditions were as follows: Cu target, kα radiation, solid detector, tube voltage 40 kV, tube current 40 mA, step scanning with a step of 0.02°, prefabrication time of 2 s, scanning range of 5°-70°. The diffraction angle refers to the 2θ value at which the diffraction peak reaches its highest value.

The silicon content, aluminum content, phosphorus content and sodium content of the molecular sieve were measured by 3271E X-ray fluorescence spectrometer from Rigaku Industrial Corporation, Japan. In particular, a powder sample was tableted, the spectral line intensity of each element was determined using rhodium target, laser voltage of 50 kV, laser current of 50 mA, a scintillation counter and a proportional counter, and a quantitative and semi-quantitative analysis of the element content was performed using an external standard method.

MOLECULAR SIEVE PREPARATION EXAMPLES

Preparation Examples 1-2 are provided for illustrating phosphorus-containing high-silica molecular sieves according to the present application and methods for preparing the same.

Preparation Example 1

500 g of a phosphorus-containing molecular sieve (a USY molecular sieve available from Changling Branch of Sinopec Catalyst Co., Ltd., having a lattice constant of 2.456 nm, a specific surface area of 672 m$^2$/g, a pore volume of 0.357 mL/g, a Na$_2$O content of 1.44 wt %, a P$_2$O$_5$ content of 1.37 wt %, a SiO$_2$ content of 76.7 wt % and an Al$_2$O$_3$ content of 20.5 wt %) was charged into a hydrothermal treatment kettle, 100% of steam was introduced, a hydrothermal treatment was carried out for 3 h at 560° C. and 0.8 MPa, and then the hydrothermally treated molecular sieve material was collected.

500 mL of deionized water was added to 50 g (dry weight) of the hydrothermally treated molecular sieve material, and slurried under stirring to obtain a first slurry. The slurry was heated to 80° C., 2.0 mol/L sulfuric acid solution was added thereto, and the addition of the acid was stopped when the pH value detected of the acidified first slurry arrived at 2.8, then the resultant was allowed to react at a constant temperature for 4 h, and filtered to obtain 40 g of a first solid product.

400 mL of deionized water was added to the first solid product, slurried under stirring to obtain a second slurry. The slurry was heated to 80° C., 2 mol/L sulfuric acid solution was added into the second slurry at a speed of 5 mol/h, calculated on the basis of H$^+$ and relative to 1 L of the second slurry, and the addition of the acid was stopped when the pH value detected of the acid-added second slurry arrived at 1.4, then the resultant was allowed to react at a constant temperature for 3 h, and filtered, and then a second solid product was collected.

The collected solid product was dried at 180° C. for 3 h to obtain a phosphorus-containing high-silica molecular sieve Y-1, its XRD pattern is shown in FIG. 1. The XRD diffraction peaks of the molecular sieve obtained are shown in Table 1, the peak heights thereof are shown in Table 2, and other properties are shown in Table 3.

Preparation Example 2

A phosphorus-containing high-silica molecular sieve Y2 was prepared as described in Preparation Example 1, except that the second acid solution was added at a rate of 15 mol/h. The XRD pattern of the phosphorus-containing high-silica molecular sieve Y-2 is shown in FIG. 1. The XRD diffraction peaks of the molecular sieve obtained are shown in Table 1, the peak heights thereof are shown in Table 2, and other properties are shown in Table 3.

Comparative Preparation Examples 1-3 were provided for illustrating non-inventive molecular sieves and methods for preparing the same.

Comparative Preparation Example 1

A PSRY molecular sieve was prepared as described in Example 1 of Chinese patent No. ZL98117286.5, which is designated as molecular sieve DY-1, and its XRD pattern is shown in FIG. 1. The XRD diffraction peaks of the molecular sieve obtained are shown in Table 1, the peak heights thereof are shown in Table 2, and other properties are shown in Table 3.

Comparative Preparation Example 2

500 g of phosphorus-free HY molecular sieve (available from Changling Branch of Sinopec Catalyst Co., Ltd. under the trade name HY, having a lattice constant of 2.465 nm, a specific surface area of 580 m$^2$/g, a pore volume of 0.33 mL/g, an Na$_2$O content of 0.3 wt %, a SiO$_2$ content of 77.7 wt %, and an Al$_2$O$_3$ content of 22 wt %) was charged into a hydrothermal treatment kettle, 100% steam was introduced, a hydrothermal treatment was performed at 500° C. and 2.0 MPa for 1 h, and then the hydrothermally treated molecular sieve material was collected.

500 mL of deionized water was added to 80 g (dry weight) of the hydrothermally treated molecular sieve material, and slurried under stirring to obtain a first slurry. The slurry was heated to 80° C., 1.0 mol/L sulfuric acid solution was added thereto, and the addition of the acid was stopped when the pH value detected of the acidified first slurry arrived at 3.0, then the resultant was allowed to react at a constant temperature for about 4 hours, and filtered to obtain 65 g of a first solid product.

600 mL of deionized water was added to the first solid product, and slurried under stirring to obtain a second slurry. The slurry was heated to 80° C., 1.0 mol/L phosphoric acid solution was added to the second slurry at a speed of 2 mol/h, calculated on the basis of $H^+$ and relative to 1 L of the second slurry, and the addition of the acid was stopped when the pH value detected of the acid-added second slurry arrived at 1.4, then the resultant was reacted at a constant temperature for about 3 h, and filtered, and then a second solid product was collected. The collected solid product was dried at 180° C. for 3 h to obtain a phosphorus-containing silicon-aluminum molecular sieve DY-2, its XRD pattern is shown in FIG. 1. The XRD diffraction peaks of the molecular sieve obtained are shown in Table 1, the peak heights thereof are shown in Table 2, and other properties are shown in Table 3.

Comparative Preparation Example 3

500 g of a phosphorus-containing molecular sieve (the same as in Example 1) was charged into a hydrothermal treatment kettle, 100% of steam was introduced, a hydrothermal treatment was carried out at 560° C. and 0.8 MPa for 3 h, and then the hydrothermally treated molecular sieve material was collected.

500 mL of deionized water was added to 60 g (dry weight) of the hydrothermally treated molecular sieve material, and slurried under stirring to obtain a first slurry. The slurry was heated to 90° C., 2.0 mol/L sulfuric acid solution was added thereto, and the addition of the acid was stopped when the pH value detected of the acidified first slurry arrived at 2.5, then the resultant was allowed to react at a constant temperature for about 4 hours, and filtered to obtain 60 g of a first solid product. The collected solid product was dried at 180° C. for 3 h to obtain a phosphorus-containing silicon-aluminum molecular sieve DY-3, its XRD pattern is shown in FIG. 1. The XRD diffraction peaks of the molecular sieve obtained are shown in Table 1, the peak heights thereof are shown in Table 2, and other properties are shown in Table 3.

TABLE 1

XRD diffraction peaks of molecular sieves obtained in Preparation Examples 1-2 and Comparative Preparation Examples 1-3

| Molecular sieves No. | First strong peak (2θ) | Second strong peak (2θ) | Third strong peak (2θ) | Fourth strong peak (2θ) | Fifth strong peak (2θ) |
|---|---|---|---|---|---|
| Y-1 | 6.1-6.8° | 10.2-10.7° | 15.8-16.5° | 20.8-21.4° | 12.1-12.6° |
| Y-2 | 6.1-6.8° | 10.2-10.7° | 15.8-16.5° | 20.8-21.4° | 12.1-12.6° |
| DY-1 | 6.0-6.5° | 15.7-16.2° | 23.5-24.0° | 20.4-20.7° | 10.0-10.5° |
| DY-2 | 5.5-6.2° | 15.7-16.2° | 10.0-10.5° | 11.8-12.2° | 20.3-20.7° |
| DY-3 | 15.7-16.0° | 6.0-6.5° | 23.7-24.3° | 11.5-12.0° | 10.0-10.5° |

TABLE 2

Peak heights of XRD diffraction peaks of molecular sieves obtained in Preparation Examples 1-2 and Comparative Preparation Examples 1-3

| Molecule Sieve No. | $I_1/I_{23.5-24.5°}$ | $I_2/I_{23.5-24.5°}$ | $I_3/I_{23.5-24.5°}$ | $I_4/I_{23.5-24.5°}$ | $I_5/I_{23.5-24.5°}$ |
|---|---|---|---|---|---|
| Y-1 | 4.6 | 3.0 | 2.1 | 1.2 | 1.2 |
| Y-2 | 10.1 | 6.4 | 3.8 | 2.3 | 1.0 |
| DY-1 | 1.3 | 1.2 | 1.0 | 0.64 | 0.54 |
| DY-2 | 8.22 | 2.96 | 2.81 | 1.75 | 1.18 |
| DY-3 | 1.37 | 1.11 | 1.0 | 0.78 | 0.76 |

TABLE 3

Other Properties of molecular sieves obtained in Preparation Examples 1-2 and Comparative Preparation Examples 1-3

| Molecular sieves No. | Silicon content, wt % | Aluminum content, wt % | Phosphorus content, wt % | Sodium content, wt % | Pore volume, mL/g | Specific surface area, m²/g |
|---|---|---|---|---|---|---|
| Y-1 | 98.5 | 0.834 | 0.59 | 0.016 | 0.407 | 500 |
| Y-2 | 97.4 | 2.05 | 0.203 | 0.052 | 0.360 | 500 |
| DY-1 | 75.8 | 20.7 | 1.37 | 1.44 | 0.357 | 672 |
| DY-2 | 76.3 | 22.6 | 0.584 | 0.193 | 0.250 | 193 |
| DY-3 | 86.3 | 12.3 | 1.14 | 0.03 | 0.470 | 698 |

Examples of Catalysts

Examples 1-6 are provided for illustrating hydrocracking catalysts according to the present application and methods for preparing the same. Comparative Examples 1-3 are presented for illustrating non-inventive hydrocracking catalysts and methods for preparing the same.

Example 1

80 g (dry weight) of the molecular sieve Y-1 and 28.8 g of pseudo-boehmite (available from Changling Branch of Sinopec Catalyst Co., Ltd. under the trade name PB90, with a dry weight proportion of 70 wt %, wherein the dry weight proportion refers to the proportion by weight of a sample obtained after being calcined at 600° C. for 3 h to the initial sample, the same applies below) were mixed, the mixture was extruded into a trilobal strip with a circumscribed circle diameter of 1.6 mm, dried at 120° C. for 3 h, and calcined at 600° C. for 3 h to obtain a carrier CS-1.

After being cooled to room temperature, 100 g of the CS-1 carrier was impregnated with 70 mL of an aqueous solution containing 34.65 g of ammonium metatungstate (having a tungsten oxide content of 82 wt %, available from Sichuan Zigong Cemented Carbide Works) and 24.37 g of nickel nitrate (having a nickel oxide content of 27.85 wt %, available from Beijing Xinguang Chemical Reagent Works), dried at 120° C. for 3 h, and calcined at 480° C. for 4 h to obtain a hydrocracking catalyst, of which the composition is shown in Table 4.

Example 2

A catalyst was prepared as described in Example 1, except that the molecular sieve Y-2 was used in place of the molecular sieve Y-1. The composition of the catalyst obtained is shown in Table 4.

Example 3

95 g (dry weight) of the molecular sieve Y-1 and 7.2 g of pseudo-boehmite were mixed, the mixture was extruded into a trilobal strip with a circumscribed circle diameter of 1.6 mm, dried at 120° C. for 3 h, and calcined at 600° C. for 3 h to obtain a carrier CS-3.

After being cooled to room temperature, 100 g of the CS-3 carrier was impregnated with 45 mL of an aqueous solution containing 13.86 g of ammonium metatungstate and 8.16 g of nickel nitrate, dried at 120° C. for 3 h, and calcined at 480° C. for 4 h to obtain a hydrocracking catalyst, of which the composition is shown in Table 4.

Example 4

5 g (dry weight) of the molecular sieve Y-1 and 135.7 g of pseudo-boehmite were mixed, the mixture was extruded into a trilobal strip with a circumscribed circle diameter of 1.6 mm, dried at 120° C. for 3 h, and calcined at 600° C. for 3 h to obtain a carrier CS-4.

After being cooled to room temperature, 100 g of the CS-4 carrier was impregnated with 70 mL of an aqueous solution containing 74 g of ammonium metatungstate and 43 g of nickel nitrate, dried at 120° C. for 3 h, and calcined at 480° C. for 4 h to obtain a hydrocracking catalyst, of which the composition is shown in Table 4.

Example 5

50 g (dry weight) of the molecular sieve Y-1 and 10 g of titanium dioxide (available from Beijing Chemical Reagent Works, purity 99%) and 57.1 g of pseudo-boehmite were mixed, the mixture was extruded into a trilobal strip with a circumscribed circle diameter of 1.6 mm, dried at 120° C. for 3 h, and calcined at 600° C. for 3 h to obtain a carrier CS-5.

After being cooled to room temperature, 100 g of the CS-5 carrier was impregnated with 80 mL of an aqueous solution containing 69 g of ammonium metatungstate and 17 g of nickel nitrate, dried at 120° C. for 3 h, and calcined at 480° C. for 4 h to obtain a hydrocracking catalyst, of which the composition is shown in Table 4.

Example 6

30 g (dry weight) of molecular sieve Y-1 and 160 g of silica sol (available from Beijing Feilongma Trade Co., Ltd. under the trade name of JN-25, having a silica content of 25%, and a silica particle size of 9-11 nm) and 42.9 g of pseudo-boehmite (available from Changling Branch of Sinopec Catalyst Co., Ltd. under the trade name PB90, with a dry weight proportion of 70 wt %) were mixed, the mixture was extruded into a trilobal strip with a circumscribed circle diameter of 1.6 mm, dried at 120° C. for 3 h, and calcined at 600° C. for 3 h to obtain a carrier CS-6.

After being cooled to room temperature, 100 g of the CS-6 carrier was impregnated with 95 mL of an aqueous solution containing 29 g of molybdenum trioxide (available from Luoyang Jinduicheng Molybdenum Industry, purity 99.6%), 67 g of cobalt nitrate (having a cobalt oxide content of 27.85 wt %, available from Beijing Xinguang Chemical Reagent Works), and 11.8 g of phosphoric acid (available from Beijing Chemical Reagent Works, purity 85%), dried at 120° C. for 3 h, and calcined at 480° C. for 4 h to obtain a hydrocracking catalyst, of which the composition is shown in Table 4.

Comparative Examples 1 to 3

A catalyst was prepared as described in Example 1, except that molecular sieves DY-1, DY-2 and DY-3 were respectively used in place of the molecular sieve Y-1. The composition of the catalyst obtained is shown in Table 4.

TABLE 4

Properties of catalysts obtained in the examples and comparative examples

| | Composition of the carrier | | Composition of the catalyst | | |
|---|---|---|---|---|---|
| Item | Refractory inorganic oxide, wt % | Molecular sieve, wt % | Group VIII metal, wt % | Group VIB metal, wt % | Carrier, wt % |
| Ex. 1 | 20 | 80 | 5 | 21 | 74 |
| Ex. 2 | 20 | 80 | 5 | 21 | 74 |
| Ex. 3 | 5 | 95 | 2 | 10 | 88 |
| Ex. 4 | 95 | 5 | 7 | 5 | 88 |
| Ex. 5 | 50 | 50 | 3 | 35 | 62 |
| Ex. 6 | 70 | 30 | 12 | 20 | 68 |
| Comp. Ex. 1 | 20 | 80 | 5 | 21 | 74 |
| Comp. Ex. 2 | 20 | 80 | 5 | 21 | 74 |
| Comp. Ex. 3 | 20 | 80 | 5 | 21 | 74 |

Test Examples

This test example was used to evaluate the catalytic activity of the catalysts obtained in Examples 1-3 and Comparative Examples 1-3 for hydrocracking reactions.

The hydrocracking activity of the catalyst was evaluated on a small fixed bed hydrocracking unit using a n-octane feedstock containing 5.61% of tetralin and 0.29% of pyridine, a catalyst loading of 0.2 ml, a reaction temperature of 320° C., a reaction pressure of 4.0 MPa, a hydrogen-to-oil volume ratio of 3600, and a liquid hourly space velocity of 30 $h^{-1}$. After 4 hours of stable feeding to the reaction, the percentage of tetralin converted in the product was recorded as a reflection of the activity of the catalyst and the results are shown in Table 5.

TABLE 5

Test results of catalysts obtained in Examples 1-3 and Comparative Examples 1-3

| Catalyst | Conversion (%) |
|---|---|
| Ex. 1 | 78.0 |
| Ex. 2 | 71.2 |
| Ex. 3 | 76.3 |
| Comp. Ex. 1 | 54.3 |
| Comp. Ex. 2 | 63.2 |
| Comp. Ex. 3 | 58.3 |

From the results shown in Table 5, it can be seen that, under comparable conditions, the hydrocracking activity of catalysts comprising a phosphorus-containing high-silica molecular sieve of the present application in the presence of a high level of nitrogen-containing species (e.g., pyridine) is improved by at least 7% as compared to catalysts comprising a non-inventive phosphorus-containing aluminium silicate molecular sieve.

The present application is illustrated in detail hereinabove with reference to preferred embodiments, but is not intended to be limited to those embodiments. Various modifications may be made following the inventive concept of the present application, and these modifications shall be within the scope of the present application.

It should be noted that the various technical features described in the above embodiments may be combined in any suitable manner without contradiction, and in order to avoid unnecessary repetition, various possible combinations are not described in the present application, but such combinations shall also be within the scope of the present application.

In addition, the various embodiments of the present application can be arbitrarily combined as long as the combination does not depart from the spirit of the present application, and such combined embodiments should be considered as the disclosure of the present application.

The invention claimed is:

1. A phosphorus-containing high-silica molecular sieve, comprising about 90-99.8 wt % of silicon, 0.1-9.0 wt % of aluminum, and about 0.01-2.5 wt % of phosphorus, calculated as oxides and based on the dry weight of the molecular sieve,
wherein the molecular sieve has an XRD pattern with at least three strong diffraction peaks, the first strong peak is present at a diffraction angles of about 5.9-6.9°, the second strong peak is present at a diffraction angle of about 10.0-11.0°, and the third strong peak is present at a diffraction angle of about 15.6-16.7°.

2. The molecular sieve according to claim 1, wherein in the XRD pattern of the molecular sieve, $I_1/I_{23.5-24.5}°$ is about 3.0-11.0, $I_2/I_{23.5-24.5}°$ is about 2.9-7.0, and $I_3/I_{23.5-24.5}°$ is about 1.0-4.0, wherein $I_1$ represents the peak height of the first strong peak, $I_2$ represents the peak height of the second strong peak, and $I_3$ represents the peak height of the third strong peak, and $I_{23.5-24.5}°$ represents the peak height of the peak at a diffraction angle of about 23.5-24.5°.

3. The molecular sieve according to claim 1, wherein the XRD pattern has a fourth strong peak present at a diffraction angle of about 20.4-21.6°, and a fifth strong peak present at a diffraction angle of about 11.8-12.8°.

4. The molecular sieve according to claim 1, wherein the first strong peak is present at a diffraction angle of about 6.1-6.8°, the second strong peak is present at a diffraction angle of about 10.2-10.7°, and the third strong peak is present at a diffraction angle of about 15.8-16.5°.

5. The molecular sieve according to claim 1, wherein the molecular sieve has a pore volume of about 0.20-0.50 mL/g and a specific surface area of about 250-670 m²/g.

6. The molecular sieve according to claim 1, wherein the molecular sieve has a pore volume of about 0.30-0.45 mL/g and a specific surface area of about 260-600 m²/g.

7. The molecular sieve according to claim 1, wherein the XRD pattern has a fourth strong peak present at a diffraction angle of about 20.8-21.4° and a fifth strong peak present at a diffraction angle of about 12.1-12.6°.

8. The molecular sieve according to claim 3, wherein in the XRD pattern of the molecular sieve, $I_4/I_{23.5-24.5}°$ is about 1.0-4.0 and $I_5/I_{23.5-24.5}°$ is about 1.0-2.0, wherein $I_4$ represents the peak height of the fourth strong peak, $I_5$ represents the peak height of the fifth strong peak and $I_{23.5-24.5}°$ represents the peak height of the peak at a diffraction angle of about 23.5-24.5°.

9. A method for preparing a phosphorus-containing high-silica molecular sieve according to claim 1, comprising the steps of:
a) subjecting a phosphorus-containing molecular sieve starting material to a hydrothermal treatment at a temperature of about 350-700° C., a pressure of about 0.1-8.0 MPa in the presence of steam for about 0.5-10 h to obtain a hydrothermally treated molecular sieve material, wherein the phosphorus-containing molecular sieve starting material has a phosphorus content of about 0.1-15 wt %, a sodium content of about 0.5-4.5 wt %, a silicon content of about 70-85 wt %, and an aluminum content of about 16.0-21.0 wt %, calculated as oxides and based on the dry weight of the phosphorus-containing molecular sieve starting material;
b) adding water to the hydrothermally treated molecular sieve material obtained in the step a) to form a first slurry, heating the first slurry to about 40-95° C., then adding a first acid solution to the first slurry, while maintaining the temperature, in an amount such that the acidified first slurry has a pH value of about 2.3-4.0, reacting at a constant temperature for about 0.5-20 h, and collecting a first solid product; and
c) adding water to the first solid product obtained in the step b) to form a second slurry, heating the second slurry to about 40-95° C., then adding a second acid solution to the second slurry, while maintaining the temperature, in an amount such that the acidified second slurry has a pH value of about 0.8-2.0, reacting at a constant temperature for about 0.5-20 h, and collecting a second solid product.

10. The method according to claim 9, wherein in step a), the phosphorus-containing molecular sieve starting material is a phosphorus-containing Y molecular sieve having a lattice constant of about 2.425-2.47 nm, a specific surface area of about 250-750 m²/g, and a pore volume of about 0.2-0.95 mL/g.

11. The method according to claim 9, wherein in step b), the ratio of the weight of water in the first slurry to the dry weight of the phosphorus-containing molecular sieve starting material is from about 14:1 to about 5:1; and/or
in step c), the ratio of the weight of water in the second slurry to the dry weight of the phosphorus-containing molecular sieve starting material is from about 0.5:1 to about 20:1.

12. The method according to claim 9, wherein in step c), the addition of the second acid solution is performed by adding the second acid solution to the second slurry at a rate of about 0.05-15 mol/h, calculated on the basis of $H^+$ and relative to 1 L of the second slurry.

13. The method according to claim 9, wherein in step b), the first acid solution has an acid concentration of about 0.01-15.0 mol/L, and the acid in the first acid solution is at least one selected from the group consisting of phosphoric acid, sulfuric acid, nitric acid, hydrochloric acid, acetic acid, citric acid, tartaric acid, formic acid, and acetic acid; and/or
in step c), the second acid solution has an acid concentration of about 0.01-15.0 mol/L, and the acid in the second acid solution is at least one selected from the group consisting of phosphoric acid, sulfuric acid, nitric acid, hydrochloric acid, acetic acid, citric acid, tartaric acid, formic acid, and acetic acid.

14. The method according to claim 9, further comprising the steps of: collecting the second solid product, then washing with water, and drying to obtain the phosphorus-containing high-silica molecular sieve.

15. A hydrocracking catalyst, comprising, based on the dry weight of the catalyst, about 45-90 wt % of a carrier, calculated on a dry basis; about 1-40 wt % of a first metal component, calculated as metal oxides; and about 1-15 wt % of a second metal component, calculated as metal oxides,
wherein the carrier comprises a phosphorus-containing high-silica molecular sieve and a refractory inorganic oxide, wherein the weight ratio of the phosphorus-containing high-silica molecular sieve to the refractory inorganic oxide is about 0.03:1 to about 20:1, and wherein the first metal component comprises a Group VIB metal, the second metal component comprises a Group VIII metal, and the phosphorus-containing high-silica molecular sieve is a phosphorus-containing high-silica molecular sieve according to claim 1.

16. A hydrocracking catalyst according to claim 15, wherein the refractory inorganic oxide is selected from the group consisting of alumina, silica, titania, zirconia, magnesia, thoria, beryllia, boria, cadmium oxide, and combinations thereof, the first metal component is selected from the group consisting of a molybdenum component, a tungsten component, and combinations thereof; and/or the second metal component is selected from the group consisting of an iron component, a nickel component, a cobalt component, and combinations thereof.

17. A method for preparing a hydrocracking catalyst according to claim 15, comprising the steps of:
i) mixing a phosphorus-containing high-silica molecular sieve with a refractory inorganic oxide to produce a carrier; and
ii) contacting the carrier with an impregnation solution containing a first metal precursor and a second metal precursor for impregnation, wherein the phosphorus-containing high-silica molecular sieve comprises about 90-99.8 wt% of silicon, 0.1-9.0 wt% of aluminum, and about 0.01-2.5 wt% of phosphorus, calculated as oxides and based on the dry weight of the molecular sieve, and has an XRD pattern with at least three strong diffraction peaks, the first strong peak is present at a diffraction angles of about 5.9-6.9 °, the second strong peak is present at a diffraction angle of about 10.0-11.0 °, and the third strong peak is present at a diffraction angle of about 15.6-16.7 °.

18. The method according to claim 17, further comprising the steps of drying and calcining the impregnated material.

19. A method for hydrocracking a hydrocarbon feedstock, comprising contacting the hydrocarbon feedstock with the hydrocracking catalyst of claim 15.

20. The method according to claim 19, wherein the hydrocarbon feedstock is selected from the group consisting of straight-run gas oils, vacuum gas oils, demetallized oils, atmospheric residues, deasphalted vacuum residues, coker distillates, catalytically cracked distillates, shale oils, tar sand oils, coal liquids, and combinations thereof; and/or conditions for the hydrocracking reaction include: a reaction temperature of about 200-650° C., a reaction pressure of about 3-24 MPa, a liquid hourly space velocity of about 0.1-50 h$^{-1}$, and a hydrogen-to-oil volume ratio of about 100-5000.

\* \* \* \* \*